Sept. 12, 1944.   O. BROWNSEY   2,358,210
KNIFE
Filed March 15, 1943
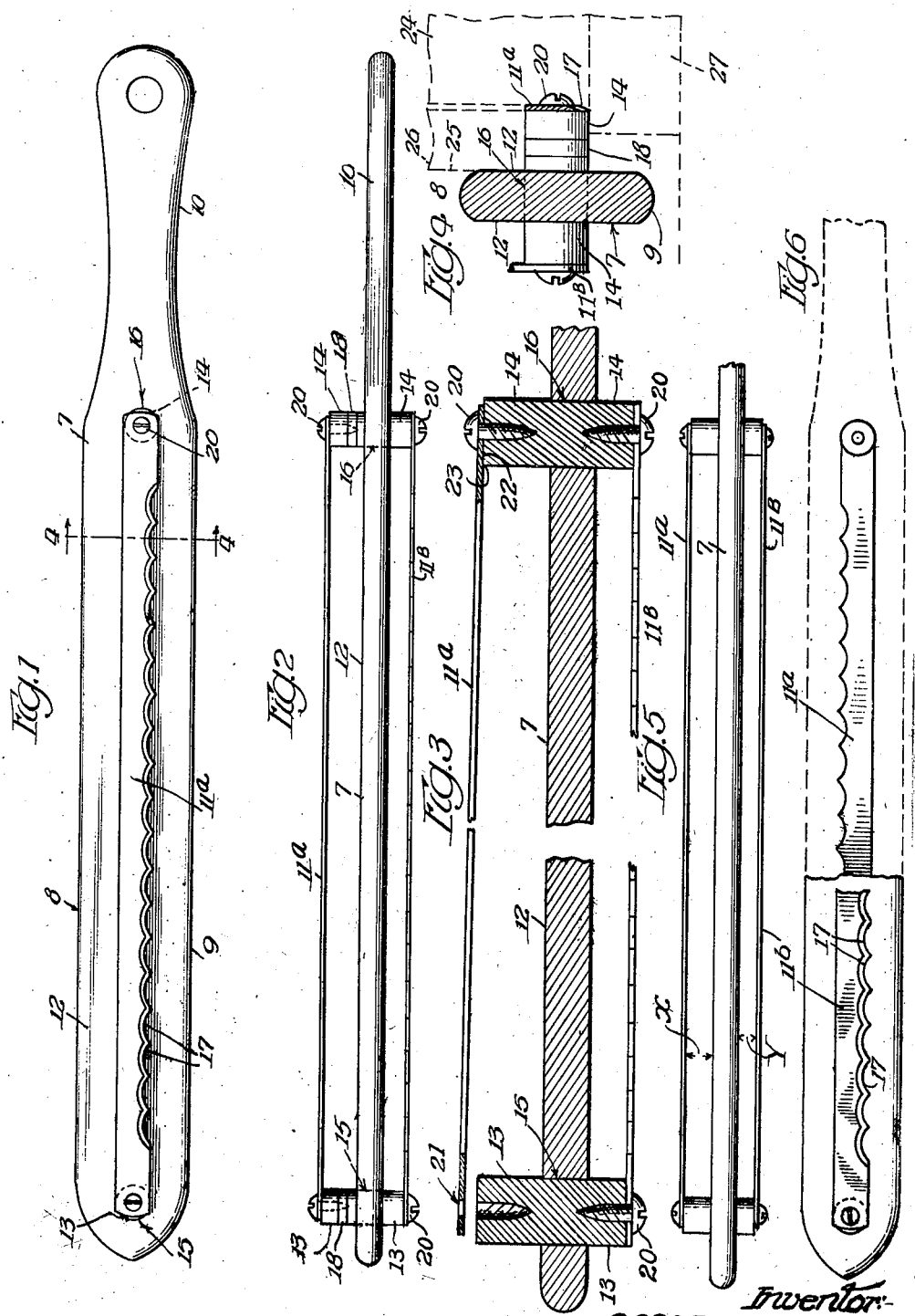
Inventor:
OSCAR BROWNSEY
By Spencer, Margall, Johnston & Cook
Attys Patented Sept. 12, 1944

2,358,210

UNITED STATES PATENT OFFICE 2,358,210

KNIFE

Oscar Brownsey, La Porte, Ind., assignor to U. S. Slicing Machine Company, La Porte, Ind., a corporation of Indiana Application March 15, 1943, Serial No. 479,159

3 Claims. (Cl. 30—283)

This invention relates to a knife and its primary object is the provision of a sturdy, simple, inexpensive cutting knife for bread and other materials whereby the thickness of slices may be gauged, and the gauged slices of uniform thickness throughout.

A further object is the provision of a new and novel knife construction whereby the knife blade is adjustable with respect to its support so that a uniform slice may be cut, there being indicia for indicating the thickness desired and for setting the knife blade in parallelism with the support.

A still further object is the provision of a supporting member whereby knives are adjustably spaced on opposite sides of a supporting member, the cutting edge of one blade extending downwardly and the cutting edge of the opposed blade extending upwardly, whereby the knife is always in adjustable position for cutting slices of predetermined thicknesses, the knife being set for two predetermined thicknesses as, for instance, one blade spaced a farther distance from the support on one side for a relatively thick slice of bread, such as white bread, the knife on the other side being set closer to the support for another kind of bread, such as rye bread.

Numerous other objects and advantages will be apparent throughout the progress of the following specification.

The accompanying drawing illustrates a selected embodiment of the invention, and the views therein are as follows:

Fig. 1 is a detail side view of the improved knife and embodying the invention;

Fig. 2 is a detail top view thereof;

Fig. 3 is a longitudinal sectional view showing the manner in which the knife is assembled;

Fig. 4 is a detail sectional view on the line 4—4 of Fig. 1, showing the knife positioned with respect to a breadboard so that a slice may be cut completely through the loaf;

Fig. 5 is a detail plan view showing the arrangement of opposed blades;

Fig. 6 is a detail elevational view of the knife shown in Fig. 5, parts being broken away for the sake of clearness.

The particular knife herein shown for the purpose of illustrating the invention comprises a central support 7 which has relatively straight upper and lower edges 8 and 9, respectively. The member 7 extends from one complete end to the other and includes a handle 10. The flexible blades 11a and 11b are carried on opposite sides of the support 7 and in generally parallel relation with the adjacent flat surfaces 12 of the support 7. These blades are carried by plugs 13 and 14 adapted for adjustment in holes 15 and 16, respectively. The knife blades 11a and 11b, which are preferably of a flexible nature and are provided with a scalloped cutting edge 17, are arranged with their cutting edges extending in opposite directions.

It has been found advantageous to use a flexible steel blade of the type that is used on the mechanically operated multi-bladed bread slicers as manufactured by the U. S. Slicing Machine Company of La Porte, Indiana. The blades as used on those mechanical machines, after they have been sharpened several times, become worn, and are deemed too fragile for use in automatic bread slicers because of the necessary tension required and the hard duty to which they are put. However, it has been found that these blades can be used with great success on a hand operated bread knife of the type disclosed in this invention.

The plugs 13 and 14 are adapted to have slidable movement within the holes 15 and 16, respectively, so that the blades 11a and 11b may be set adjustably with respect to the support 7. These plugs may be provided with indicia 18 to determine the thicknesses of slices. In other words, when the indicia is adjacent the guide or support 7, a slice of a known thickness is cut, also the indicia 18 is an indication for determining the parallelism of the blades 11a and 11b with respect to the guides 7.

Washers 19 are arranged on one side of the support 7 so as to prevent the plugs 13 and 14 from slipping out of the body or support 7. The blade 11 is adapted to be secured to the plugs 13 and 14 by means of screws 20, there being a hole 21 provided in each end of the blade to receive a screw 20. At least one of the plugs for each blade may be provided with an inclined surface 22 so that when the blade is secured in place there will be a tension on the blade, the tension being caused by a slight deflection over the edge 23.

The plugs 13 and 14 are slidably mounted in their respective openings so that the plugs may be moved inwardly and outwardly so that the blade may be brought closer to, or further from, the surface 12 to increase or decrease the thickness of the slice to be cut. When the plugs are slid to make a thinner slice, the movement toward the member 7 is limited by the adjacent knife blade. Movement in a reverse direction is limited by the opposite blade and inasmuch as the opposite blade is greater in diameter than the holes 15 and 16, the plugs are prevented from being dislodged.

The surface 12 is adapted to engage a loaf of material, such as bread 24, Fig. 4, and is in constant engagement with the face 25 of the loaf. Therefore, an even slice 26 will be cut from the loaf 24 by the knife blade. If the loaf 24 is mounted upon a breadboard 27, the lower edge of the guide or supporting member 7 will extend below the upper surface of the breadboard, as clearly shown in Fig. 4, thereby permitting the slice of bread to be completely cut through the loaf as clearly indicated in that figure.

The blades 11a and 11b are similar to each other in all respects, except, as shown in Fig. 6, blade 11a has its cutting edge extending upwardly and blade 11b has its cutting edge extending downwardly. By having the two blades 11a and 11b mounted as shown in Figs. 5 and 6 there may be set thicknesses of slices, the distance indicated at X in Fig. 5 being greater than the distance indicated at Y. Therefore, when a thick slice is to be cut, the blade 11a will be used, and to use the blade 11b the knife will be turned 180°. Hence the blade 11a will be the blade which cuts the loaf, and one face of the supporting member will be the guide. When it is desired to cut a thinner slice, the blade 11b is used. Consequently, slices of different thicknesses may be cut from the same loaf or from different loaves.

It has been found convenient, however, and practical, to set one blade a predetermined distance away from the guide for cutting white bread. Then when the knife is merely rotated 180° a thinner slice may be obtained from the same loaf, or from a different kind of bread, such as rye bread.

In actual practice, the member 7 is made in one piece and is preferably made from wood. However, it may be made from plastic or from steel or any other material desired. During the present steel shortage it has been found desirable and advantageous to make the supporting guide member 7 of wood, provide wooden plugs 13 and 14, and use resharpened knives or blades 11a and 11b.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. A knife comprising a support, a knife blade mounted on opposite sides of the support, the cutting edges of said blades facing in opposite directions.

2. A bread slicing knife comprising a wood support having opposed surfaces and a handle, a pair of spaced blade supporting members slidably mounted in said wood support and adapted to extend through the support, and a blade mounted on each side of the support and connected to said supporting members, whereby adjustment of one blade closer to the support will move the other blade further from said support, each opposed surface of the support being adapted to act as a guide when engaged with the surface of a loaf of bread to guide the blade, one of said blades having its cutting edge extending upwardly and the cutting edge of the other blade extending downwardly.

3. A bread slicing knife comprising a wood support having opposed surfaces and a handle, a pair of spaced blade supporting members slidably mounted in said wood support and adapted to extend through the support, and a blade mounted on said supporting members on each side of the support, whereby adjustment of one blade closer to the support will move the other blade further from said support, each opposed surface of the support being adapted to act as a guide when engaged with the surface of a loaf of bread to guide the blade, one of said blades having its cutting edge extending upwardly and the cutting edge of the other blade extending downwardly, said blade supporting members carrying indicia to indicate slice thicknesses and to provide means to determine whether or not the blades are parallel to the opposed surfaces.

OSCAR BROWNSEY.